United States Patent
Han et al.

(10) Patent No.: US 6,522,893 B1
(45) Date of Patent: Feb. 18, 2003

(54) METHOD FOR SETTING TIMER OF CELLULAR PHONE

(75) Inventors: Sung-hoo Han, Suwon (KR); Sang-ug Kang, Sungnam (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/431,170

(22) Filed: Nov. 1, 1999

(30) Foreign Application Priority Data

Jul. 16, 1999 (KR) .............................................. 99-28905

(51) Int. Cl.⁷ ................................................ H04B 1/38
(52) U.S. Cl. ........................................ 455/550; 455/566
(58) Field of Search ................................ 455/566, 575, 455/550, 90, 424; 379/419

(56) References Cited

U.S. PATENT DOCUMENTS

| | | | | |
|---|---|---|---|---|
| 4,385,204 A | * | 5/1983 | Wine .......................... 381/109 |
| 4,969,180 A | * | 11/1990 | Watterson et al. .......... 379/56.1 |
| 5,396,264 A | * | 3/1995 | Falcone et al. ............. 345/146 |
| 5,422,656 A | * | 6/1995 | Allard et al. ................ 345/173 |
| 5,542,103 A | * | 7/1996 | Mottier et al. .............. 455/566 |
| 5,627,531 A | * | 5/1997 | Posso et al. ................... 341/22 |
| 5,629,684 A | * | 5/1997 | Isshiki et al. .......... 340/825.22 |
| 5,633,912 A | * | 5/1997 | Tsoi ............................ 455/566 |
| 5,703,947 A | * | 12/1997 | Hino et al. ................. 379/419 |
| 5,894,276 A | * | 4/1999 | Altidor et al. ............... 340/7.2 |
| 5,987,336 A | * | 11/1999 | Sudo et al. ................. 455/566 |
| 6,161,026 A | * | 12/2000 | Uchida ....................... 455/566 |
| 6,198,939 B1 | * | 3/2001 | Holmstrom et al. ........ 455/550 |

* cited by examiner

*Primary Examiner*—Dwayne Bost
*Assistant Examiner*—Joy K. Contee
(74) *Attorney, Agent, or Firm*—Sughrue Mion, PLLC

(57) ABSTRACT

A method for setting the timer of a mobile telephone and a mobile telephone employing the method wherein a volume control button is used to control both a timer setting operation of the mobile telephone as well as the volume of the mobile telephone. When the volume control button is pressed on the mobile telephone, it is determined whether a predetermined amount of time has passed before the volume control button is then released. If the volume control button is held down for at least the predetermined amount of time, the mobile telephone enters a timer setting mode in which a time is entered for activating an alarm. If, on the other hand, the volume control button is pressed and released before the predetermined amount of time has passed, the mobile telephone enters a volume control mode in which the relative strength of the audible signals is controlled.

6 Claims, 3 Drawing Sheets

METHOD FOR SETTING TIMER OF CELLULAR PHONE

BACKGROUND OF THE INVENTION

1. Field of the Invention

The present invention relates to a method of setting the timer of a cellular phone, and more particularly, to a method of setting the timer of a cellular phone by which it is possible to simply set the timer using only the volume control buttons of a cellular phone.

This Application is based on Korean Patent Application No. 99-28905, which is incorporated herein by reference for all purposes.

2. Description of the Related Art

In general, cellular phones include a timer. A user sets the timer and the cellular phone on which the timer is set performs an alarm function by sounding a terminating signal at a predetermined time. The alarm function used in a conventional cellular phone is performed by selecting an alarm menu from general menus using a menu selection button and setting the desired alarm time by the alarm menu using an up/down button and a setting button.

In general, a user needs an alarm to go off at a certain time for many different reasons. For example, when an appointment time is thirty minutes away, the user needs the alarm to go off after a period of thirty minutes. According to a conventional method, the time at which the alarm is to be sounded is set by inputting the desired alarm time by adding a certain time to the current time using, for example, an up/down key. The time setting is completed using a selection key and a setting completion key. According to the conventional method, it is complicated to set the time at which the alarm is to be sounded since the time is obtained by adding a certain time to the current time.

SUMMARY OF THE INVENTION

To solve the above problem, it is an object of the present invention to provide a method for setting the timer of a cellular phone so an alarm is sounded at a certain time by using only a predetermined up/down button which is also used for performing another function.

It is another object of the present invention to provide a recording medium in which a program code for performing the method for setting the alarm of the cellular phone is stored.

Accordingly, to achieve the first object, there is provided a method for setting the alarm of a cellular phone by which a user can set an alarm to sound at a determined time, the method comprising the steps of (a) checking whether a volume control button has been pressed, (b) maintaining a stand-by state if it is not confirmed that the volume control button has been pressed in step (a) and then checking whether the volume control button has been released if it is confirmed that the volume control button has been pressed in step (a), (c) controlling the volume if it is confirmed that the volume control button has been released in step (b) and checking whether a first predetermined period of time has passed if it is confirmed that the volume control button has not been released in step (b), (d) performing step (b) again if it is confirmed that the first predetermined period of time has not passed in step (c), and (e) displaying an indication of a timer setting mode on a display and starting to set the timer if it is confirmed that the first predetermined period of time has passed in step (c).

Step (e) preferably comprises the steps of (e-1) checking whether the volume control button is pressed, (e-2) maintaining a stand-by state if it is confirmed that the volume control button has not been pressed in step (e-1) and checking whether the volume control button has been released if it is confirmed that the volume control button is pressed, (e-3) setting a low speed timer if it is confirmed that the volume control button has been released in step (e-2), (e-4) checking whether a second predetermined period of time has passed if it is confirmed that the volume control button has not been released in step (e-2), (e-5) performing step (e-2) if it is confirmed that the second predetermined period of time has not passed in step (e-4), (e-6) checking whether the volume control button has been released if it is confirmed that the second predetermined time has passed in step (e-4), (e-7) setting a high speed timer if it is confirmed that the volume control button has not been released in step (e-6), (e-8) checking whether a third predetermined period of time has passed if it is confirmed that the volume control button has been released in step (e-6), (e-9) completing the setting of the timer if the third predetermined period of time has passed in step (e-8), (e-10) checking whether the volume control button has been pressed if the third predetermined period of time has not passed in step (e-8), and (e-11) performing step (e-8) if it is confirmed that the volume control button has not been released in step (e-10) and performing step (e-6) again if it is confirmed that the volume control button has been pressed in step (e-10).

A cellular phone device in accordance with the invention includes an alarm device that provides an alarm at a given alarm time provided by a user of the cellular phone, an alarm timer that triggers the alarm device to provide an alarm upon expiration of said alarm time, a volume control button for controlling the volume of the cellular phone and for controlling the alarm time provided by the user of the phone. Further, the alarm time is input to the alarm timer by the user by manipulating the volume control button.

Additionally, a cellular phone in accordance with another embodiment of the invention includes a control device that continuously determines if the volume control button has been pressed and further allows for a volume control operation to be performed if the volume control button has been pressed and released. Further, the control device repeatedly checks if a first predetermined period of time has passed in the event the volume control button has been pressed but not released. If the first predetermined time has passed, a display indicates a timer setting mode and the control device allows an alarm timer setting mode to begin.

A key scan algorithm used for a microcomputer system including a keyboard is preferably applied in order to check whether the volume control button has been pressed in step (a).

To achieve the second object of the invention, there is provided a computer readable recording medium in which a program code for performing the method for setting the alarm of the cellular phone by which a user sets an alarm to sound at a desired time is stored, wherein the program code performs the steps of (a) checking whether a volume control button has been pressed, (b) maintaining a stand-by state if it is not confirmed that the volume control button has been pressed in step (a) and then checking whether the volume control button has been released if it is confirmed that the volume control button has been pressed in step (a), (c) controlling the volume if it is confirmed that the volume control button has been released in step (b) and checking whether a first predetermined period of time has passed if it is confirmed that the volume control button has not been released in step (b), (d) performing step (b) again if it is confirmed that the first predetermined time has not passed in step (c), and (e) displaying an indication of a timer setting mode on a displaying means and starting to set the timer if it is confirmed that the first predetermined period of time has passed in step (c).

BRIEF DESCRIPTION OF THE DRAWING(S)

The above objects and advantages of the present invention will become more apparent by describing in detail a preferred embodiment thereof with reference to the attached drawings in which.

DESCRIPTION OF THE PREFERRED EMBODIMENT

Hereinafter, a preferred embodiment of the present invention will be described in detail with reference to the attached drawings.

Figure 1A:
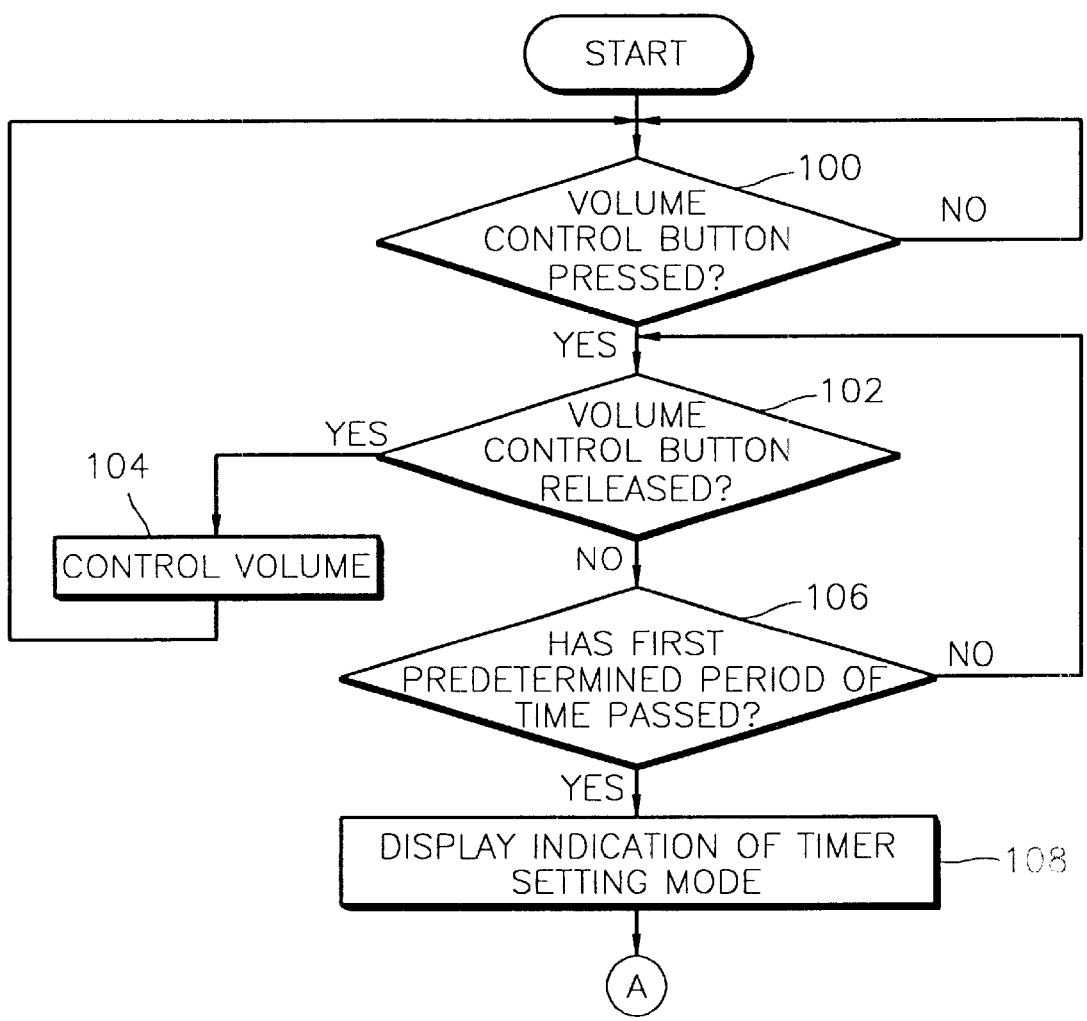
FIGS. 1A and 1B are flowcharts showing the main steps of a method for setting the timer of a cellular phone according to an embodiment of the present invention.
Figure 1B:
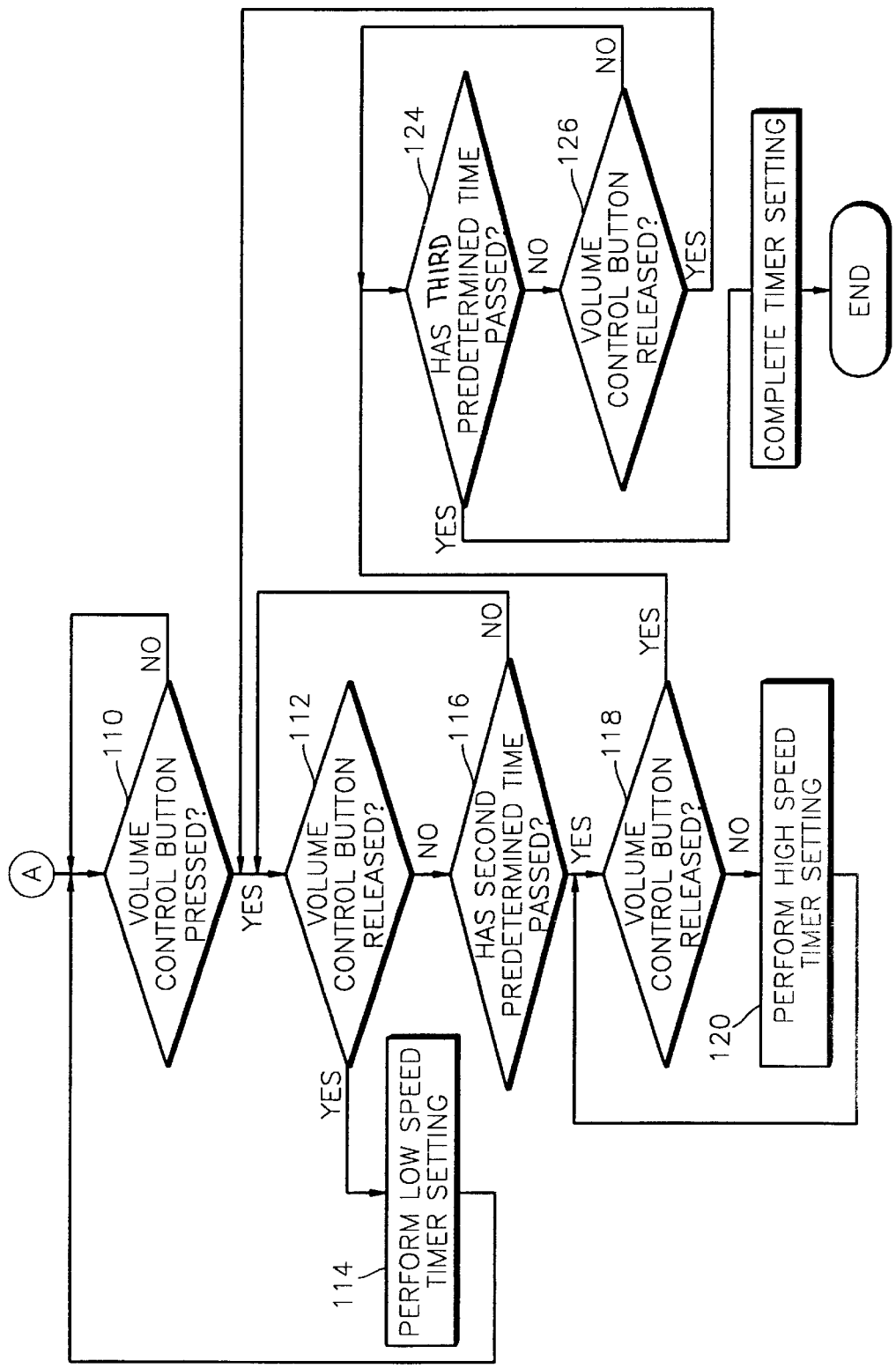

FIGS. 1A and 1B are flow charts showing the main steps of a method for setting the timer of a cellular phone according to an embodiment of the present invention. Referring to FIGS. 1A and 1B, in the method for setting the timer of a cellular phone according to the present invention, it is checked whether a volume control button has been pressed (step 100). A key scan algorithm such as the one used for a microcomputer system including a keyboard is suitable for checking whether the volume control button has been pressed. If it is not confirmed that the volume control button has been pressed in step 100, a stand-by state is maintained. If it is confirmed that the volume control button has been pressed in step 100, it is then checked whether the volume control button has been released (step 102). If it is confirmed that the volume control button has been released in step 102, volume controlling is performed (step 104). If it is confirmed that the volume control button has not been released in step 102, it is checked whether a first predetermined period of time has passed (step 106). If it is confirmed that the first predetermined time has not passed in step 106, step 102 is performed again. If it is confirmed that the first predetermined period of time has passed in step 106, an indication of a timer setting mode is displayed on a display means (not shown) (step 108) and a timer setting mode begins.

A user who knows the method of setting the timer can start a timer setting mode without causing mis-operation by starting to set the timer by pressing the volume control button for no less than a predetermined time and performing general volume control when the volume control button is pressed for less than the predetermined time.

As shown in FIG. 1B, after the timer setting mode starts, it is checked whether the volume control button has been pressed (step 110). If it is not confirmed that the volume control button has been pressed in step 110, a stand-by state is maintained. If it is confirmed that the volume control button has been pressed in step 110, it is then checked whether the volume control button has been released (step 112). If it is confirmed that the volume control button has been released in step 112, low speed timer setting is performed (step 114). If it is confirmed that the volume control button has not been released in step 112, it is checked whether a second predetermined time has passed (step 116). If it is confirmed that the second predetermined time has not passed in step 116, step 112 is performed again. If it is confirmed that the second predetermined time has passed in step 116, it is checked whether the volume control button has been released (step 118). If it is confirmed that the volume control button has been released, high speed timer setting is performed (step 120). If it is confirmed that the volume control button has been released in step 118, a step 124 is performed. In step 124, it is checked whether a third predetermined period of time has passed. If the third predetermined time has passed, the timer setting is completed (step 128). If the third predetermined time has not passed, it is then checked whether the volume control button has been released (step 126). If it is confirmed that the volume control button has not been released, step 124 is performed again. If it is confirmed that the volume control button has been released, step 112 is performed again, thus letting the low speed timer setting (step 114) be performed.

In low speed timer setting and high speed timer setting using the volume control button, a programmed alarm time is set in units of one minute by the volume up/down key. In the high speed timer setting, the alarm programmed time is advanced quickly. Accordingly, a user can finely set the timer at a low speed by releasing the volume setting button when a time close to the alarm time desired by the user is displayed. Also, it is possible to simply perform the alarm setting by using only the volume control button since the timer setting is performed using the volume control button alone and operation of the timer is started when the volume control button is not pressed for a predetermined long period of time.

For example, when the user gets into a certain means of transportation and wishes to sleep for a certain length of time, the user can set the timer to sound the alarm after a period of time for which the user expects to sleep using only the volume control button of the cellular phone. Also, it is not necessary for the user to press the setting completion button since the timer setting is automatically completed if the volume control button is not pressed for the predetermined long period of time.

According to the method for setting the alarm of the cellular phone of the present invention, the user can start the timer setting mode by using the volume control button without causing mis-operation and the user can set the timer to sound the alarm after a desired period of time using only the volume control button.

The method for setting the alarm of the cellular phone can be realized by a program written in assembler programming or an upper level programming language. The method for setting the alarm of the cellular phone can be prepared as a computer program. The computer program includes a program code and code segments. The program code and the code segments which form the program can be easily developed by a computer programmer skilled in the art. Such a program can be transformed into an executable file and stored in an EEPROM read by the microcomputer included in the cellular phone. Alternatively, the program can be permanently recorded on a ROM and included in the cellular phone as a device. Also, programs which realize such a method can be downloaded from an external network such as the Internet network.

As mentioned above, according to the method for setting the alarm of the cellular phone of the present invention, the user can initiate the timer setting mode using only the up/down button such as the volume control button and he can set the timer to sound the alarm after a desired period of time.

Figure 2:
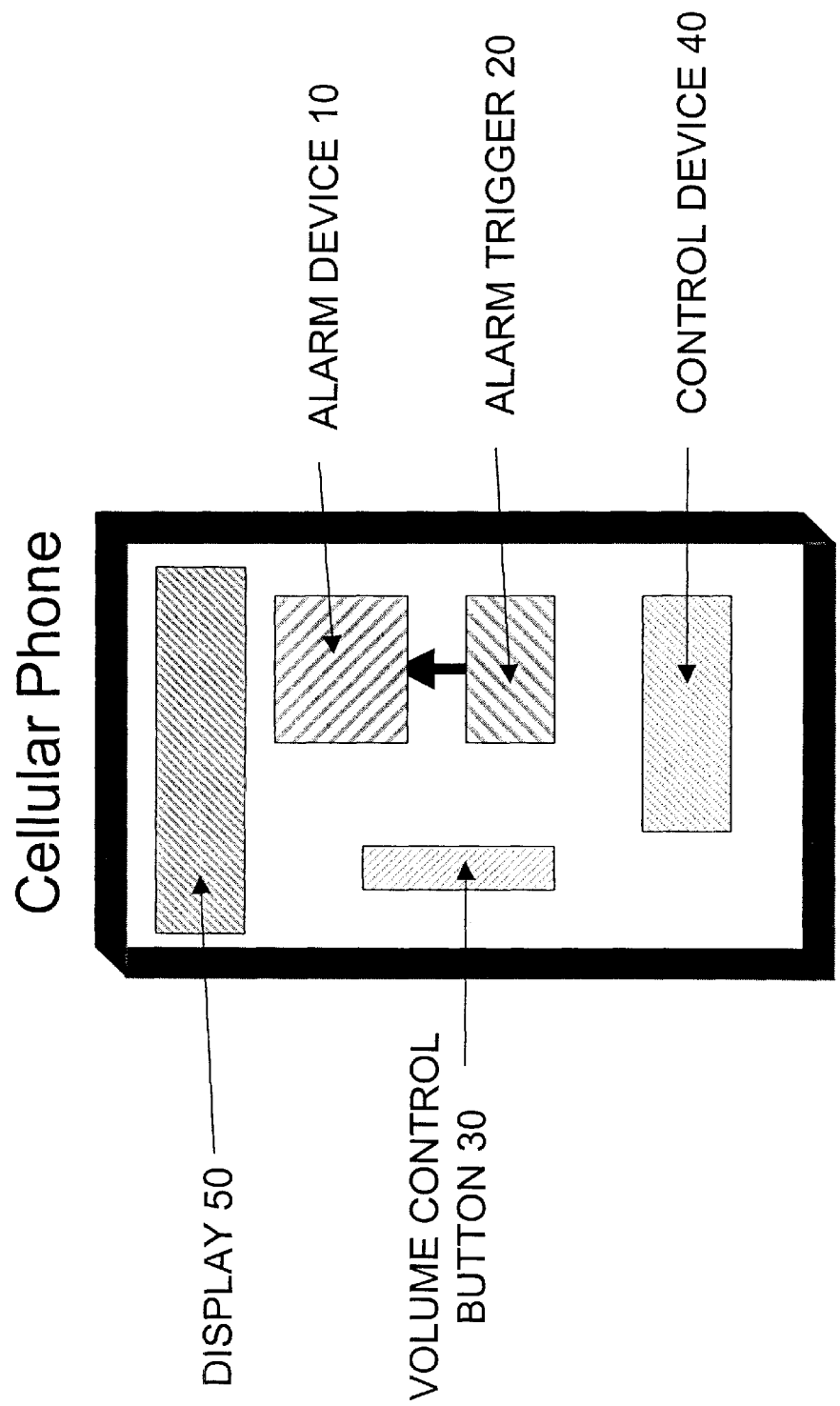
FIG. 2 is a block diagram illustrating a cellular phone device that employs a method of setting an alarm timer in accordance with the present invention.

In FIG. 2, a cellular phone device in accordance with the invention is shown. The phone includes an alarm device (10) that provides an alarm at a given alarm time provided by a user of the cellular phone. An alarm timer (20) triggers the alarm device (10) to provide an alarm upon expiration of the alarm time. A volume control button (30) is provided for controlling the volume of the cellular phone and for controlling the alarm time provided by the user of the phone. Further, the alarm time is input to the alarm timer (20) by the user by manipulating the volume control button (30) in accordance with the method described previously.

Also shown in FIG. 2 is a control device (40) that continuously determines if the volume control button (30) has been pressed and further allows for a volume control operation to be performed if the volume control button (30) has been pressed and released. Further, the control device (40) repeatedly checks if a first predetermined period of time has passed in the event the volume control button (30) has been pressed but not released. If the first predetermined time has passed, a display (50) indicates a timer setting mode and the control device (40) allows an alarm timer setting mode to begin.

What is claimed is:

1. A method for setting an alarm of a cellular phone by which a user can set an alarm to be given at a determined time, said method comprising the steps of:

(a) checking whether a volume control button has been pressed;

(b) maintaining a stand-by state if it is not confirmed that the volume control button has been pressed in step (a) and then checking whether the volume control button has been released if it is confirmed that the volume control button has been pressed in step (a);

(c) controlling a volume of the cellular phone if it is confirmed that the volume control button has been released in step (b) and checking whether a first predetermined period of time has passed if it is confirmed that the volume control button has not been released in step (b);

(d) performing step (b) again if it is confirmed that the first predetermined period of time has not passed in step (c); and (e) displaying an indication of a timer setting mode on a display and starting to set the timer if it is confirmed that the first predetermined period of time has passed in step (c).

2. The method of claim 1, wherein step (e) comprises the steps of:

(e-1) checking whether the volume control button is pressed;

(e-2) maintaining a stand-by state if it is confirmed that the volume control button has not been pressed in step (e-1) and checking whether the volume control button has been released if it is confirmed that the volume control button is pressed;

(e-3) setting a low speed timer if it is confirmed that the volume control button has been released in step (e-2);

(e-4) checking whether a second predetermined period of time has passed if it is confirmed that the volume control button has not been released in step (e-2);

(e-5) performing step (e-2) if it is confirmed that the second predetermined period of time has not passed in step (e-4);

(e-6) checking whether the volume control button has been released if it is confirmed that the second predetermined time has passed in step (e-4);

(e-7) setting a high speed timer if it is confirmed that the volume control button has not been released in step (e-6);

(e-8) checking whether a third predetermined period of time has passed if it is confirmed that the volume control button has been released in step (e-6);

(e-9) completing the setting of the timer if the third predetermined period of time has passed in step (e-8);

(e-10) checking whether the volume control button has been pressed if the third predetermined period of time has not passed in step (e-8); and (e-11) performing step (e-8) if it is confirmed that the volume control button has not been released in step (e-10) and performing step (e-6) again if it is confirmed that the volume control button has been pressed in step (e-10).

3. The method of claim 1, wherein a key scan algorithm used in a microcomputer system including a keyboard is applied to check whether the volume control button has been pressed in step (a).

4. A computer readable recording medium in which a program code is stored for performing a method for setting an alarm of a cellular phone by which a user sets the alarm to sound at a desired time, wherein the program code performs the steps of:

(a) checking whether a volume control button has been pressed;

(b) maintaining a stand-by state if it is not confirmed that the volume control button has been pressed in step (a) and then checking whether the volume control button has been released if it is confirmed that the volume control button has been pressed in step (a);

(c) controlling a volume of the cellular phone if it is confirmed that the volume control button has been released in step (b) and checking whether a first predetermined period of time has passed if it is confirmed that the volume control button has not been released in step (b);

(d) performing step (b) again if it is confirmed that the first predetermined time has not passed in step (c); and (e) displaying an indication of a timer setting mode on a displaying means and starting to set the timer if it is confirmed that the first predetermined period of time has passed in step (c).

5. A cellular phone comprising:

an alarm device that provides an alarm at a given alarm time provided by a user of the cellular phone;

an alarm timer that triggers said alarm device to provide an alarm upon expiration of said alarm time;

a volume control button for controlling a volume of said cellular phone and for controlling said alarm time provided by said user;

wherein said alarm time is input to said alarm timer by said user using said volume control button.

6. A cellular phone in accordance with claim 5 further comprising a control device wherein said control device continuously determines if said volume control button has been pressed and allows for a volume control operation to be performed if said volume control button has been pressed and released, and repeatedly checks if a first predetermined period of time has passed if said volume control button has been pressed but not released and displaying an indication of a timer setting mode on a display and allowing an alarm timer setting mode to begin if said first predetermined period of time has passed.

* * * * *